United States Patent
Polaco, II et al.

[11] Patent Number: 6,125,742
[45] Date of Patent: Oct. 3, 2000

[54] SEED CELLER HAVING DUAL DRIVES FOR TURNING FIN AND SEED CELL KNIFE

[75] Inventors: Joseph V. Polaco, II, Pueblo West; Dwight A. Blickensderfer; Matthew S. Howarth, both of Pueblo, all of Colo.; Barry M. Campbell, Victoria, Australia; Stanley M. Miller, Pueblo; Michael H. Fritz, Colorado Springs, both of Colo.

[73] Assignee: Atlas Pacific Engineering Company, Pueblo, Colo.

[21] Appl. No.: 09/502,122

[22] Filed: Feb. 10, 2000

[51] Int. Cl.[7] .............................. A23N 4/00; A23N 4/14
[52] U.S. Cl. .............................. 99/564; 99/542; 99/547; 99/591
[58] Field of Search ..................... 99/542, 544, 547–566, 99/591, 593; 403/109; 426/484, 485

[56] References Cited

U.S. PATENT DOCUMENTS

| | | | |
|---|---|---|---|
| 2,065,413 | 10/1936 | Thompson | 99/591 |
| 3,055,408 | 9/1962 | Harrer | 99/564 |
| 3,058,502 | 10/1962 | Loveland | 99/564 |
| 3,144,121 | 8/1964 | Smith | 99/547 X |
| 3,797,639 | 3/1974 | Smith | 99/542 X |
| 4,010,842 | 3/1977 | Smith | 99/591 X |
| 4,046,067 | 9/1977 | Loveland et al. | 99/543 |
| 4,487,307 | 12/1984 | Meissner et al. | 99/542 X |
| 4,595,383 | 6/1986 | Nienhaus | 403/109 |
| 4,766,990 | 8/1988 | Colombo | 99/542 X |
| 4,819,293 | 4/1989 | Nicholson | 403/109 |
| 4,907,687 | 3/1990 | Meissner et al. | 99/547 X |
| 5,027,699 | 7/1991 | Paterson et al. | 99/593 |

*Primary Examiner*—Timothy Simone
*Attorney, Agent, or Firm*—Bruce H. Johnsonbaugh

[57] ABSTRACT

An apparatus for coring and seed celling pears, apples, honeydew melons, cantaloupe and other fruits is provided in which a seed celler support tube is utilized to drive a seed celler knife and wherein a coring tube is utilized to rotate said fruit by one or more turning fins mounted on the coring tube. Separate and independent stepper motor drives are provided for the coring tube and the seed celler support tube. During a portion of the peeling process, the turning fin and seed celler knife are rotated at the same speed. In order to sever the seed cell, the seed celler blade is caused to either rotate faster or slower than the turning fin to sever the seed cell.

5 Claims, 5 Drawing Sheets

SEED CELLER HAVING DUAL DRIVES FOR TURNING FIN AND SEED CELL KNIFE

BACKGROUND AND BRIEF SUMMARY

The present invention relates in general to fruit processing equipment. More particularly, the present invention provides a seed celler for use on fruit and having two independent drive mechanisms, one for the turning fin that rotates the fruit during the peeling process and one for the seed cell knife. The present invention may be used for pears, apples, honeydew melons, cantaloupe and possibly other fruits.

The prior art includes several seed cell mechanisms. U.S. Pat. No. 5,435,238 is owned by the assignee of this application. This patent teaches a seed celler in which the seed celling knife rotates simultaneously with a turning fin. The turning fin causes the pear to rotate during the peeling operation. Just prior to completion of the peeling process, the '238 patent abruptly stops the rotation of the seed celling knife, but the pear continues to rotate on the turning fin. The rotating pear suddenly impacts the stopped seed cell knife, and the seed cell is severed in one complete revolution of the turning fin. Applicants believe that the invention of this present application will reduce bursting or breakage of pears and other fruit during the seed celling operation to lower levels than that attained by the prior art. Applicants believe that the sudden and abrupt stopping of the seed cell knife and the subsequent severing of the seed cell during only a single revolution of the pear causes occasional bursting or breakage of pears because of the large instantaneous relative motion between the pear and the seed cell knife. The present invention seeks to reduce that breakage or bursting of the pear (or other fruit) by causing a smaller magnitude of instantaneous relative rotational motion between the seed celling knife and the pear itself.

A further disadvantage of U.S. Pat. No. 5,435,238 is the use of a disengageable drive pin as part of an indirect drive mechanism which must be interrupted to abruptly stop the seed cell knife. The present invention utilizes two direct drive trains and avoids the use of the mechanical parts necessary for the indirect drive and disengageable drive pin of U.S. Pat. No. 5,435,238.

The prior art also includes the Harrer U.S. Pat. No. 3,055,408 which required that the pear be brought to a complete standstill after the peeling process was completed and before initiating the seed cell severing process. With the pear stationary on the coring tube, the Harrer patent taught that clamping jaws grasp the outside of the pear to prevent the pear from rotating and then the internally positioned seed cell knife would be caused to rotate, thereby severing the seed cell. The Harrer mechanism took more time than the present invention to peel and seed cell a pear, since the two processes were separate.

Reducing the breakage or bursting of pears and other fruit during the seed celling process is a continuing demand on the part of various canners and food processing companies. For example, a 1% reduction in the amount of pears lost due to breakage or bursting during the seed celling operation of a single pear processing machine is estimated to cost a typical customer over $60,000 per year. In addition to the monetary cost of the lost pears, there are also occasional more serious consequences if the burst or broken pear fouls the pear processing machine as a whole. For example, if a pear is burst or broken near the end of the seed celling operation, it is possible that the remnants of the broken pear will not be successfully ejected and tend to foul the mechanism and cause the loss of further pears until the remnants are removed.

According to the present invention, two separate and independent drive mechanisms are provided, one of which causes rotation of the turning fin and the second causing rotation of the seed celler knife. As the first drive mechanism rotates the turning fin, the pear (or other fruit) is rotated a predetermined number of revolutions while the fruit is being peeled. During this part of the procedure, the seed celling knife is driven at the same rotational speed as the turning fin. At a predetermined part of the peeling cycle, the drive mechanism for the seed celling knife either increases or reduces the rotational speed of the seed celling knife relative to the turning fin and imparts a relatively gradual severing of the seed cell. The relative motion between the two drive mechanisms may be adjusted so that the complete severing of the seed cell may be accomplished over the course of a predetermined number of revolutions of the fruit. For example, the seed cell knife could be driven at a slightly higher rotational speed than the turning fin and programmed to sever the seed cell during the course of four complete revolutions of the pear. By severing the seed cell during the course of four revolutions of the pear, as opposed to severing the seed cell during only a single revolution of the pear, as taught by U.S. Pat. No. 5,435,238, the relative rotation between the pear and the seed celler knife is reduced by a factor of 4. It is believed that the significant reduction of relative rotation between the pear and the seed cell knife will significantly reduce the breakage or bursting of the pear or other fruit during the seed celling operation.

A primary object of the invention is to therefore provide a seed celling apparatus which severs the fruit's seed cell as the fruit is rotated during the peeling process but which severs the seed cell during the course of more than one revolution of the fruit and with less instantaneous relative rotation between the seed celler knife and fruit than the prior art.

A further object of the invention is to provide a fruit seed celling apparatus having a first drive mechanism for rotating the turning fin and a second independent drive mechanism for rotating the seed celler knife and, wherein during the course of peeling the fruit, the seed celler knife is driven at either a faster or lower speed than the turning fin to sever the seed cell.

Yet another object of the invention is to provide a seed celling apparatus having two independent stepper motor drives for independently causing the fruit to rotate at a first speed during the peeling process and to cause the seed celler knife to rotate at a different speed to sever the seed cell.

Another object of the invention is to provide two direct drive systems for the turning fin and seed cell knife and to avoid the indirect drive and disengageable pin mechanisms of the prior art.

Other objects and advantages will become apparent from the following description and drawings wherein:

DETAILED DESCRIPTION OF THE DRAWINGS

Figure 1:
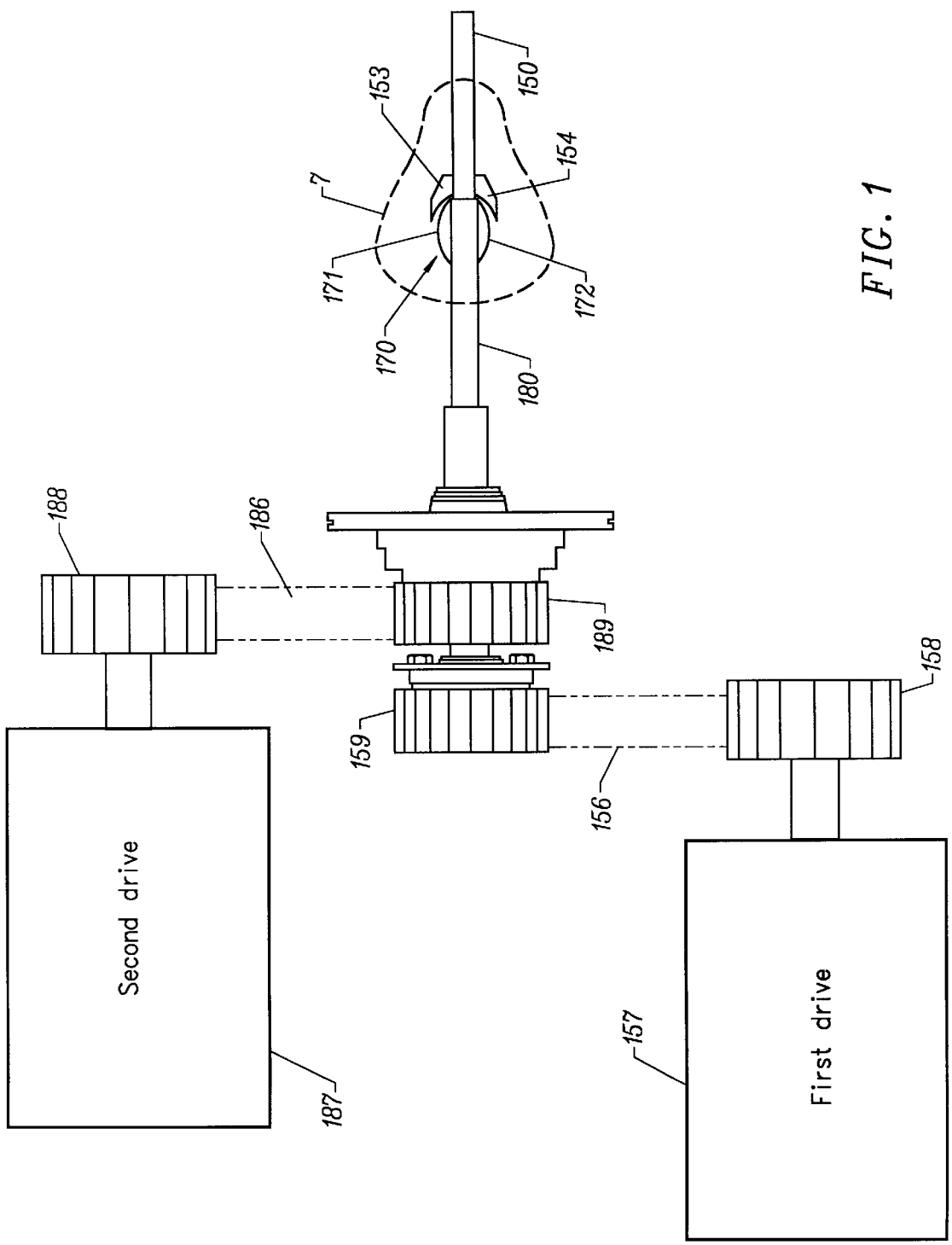
FIG. 1 is a schematic representation of the invention showing the preferred embodiment of two direct drive stepper motors.

FIG. 1 illustrates the two independent drive trains of the present invention. A first drive train is connected to the coring tube 150 and includes a first stepper motor 157 and a drive pulley or wheel 158 which is connected to the coring tube drive pulley or wheel 159 through a belt drive 156. First stepper motor rotates the turning fin or fins at approximately the same speed for peeling as the apparatus of U.S. Pat. No. 5,435,238.

A second drive train connected to the seed celler support tube 180 includes a second stepper motor 187 which drives an output pulley or wheel 188. Output pulley or wheel 188 drives the seed celler support tube drive pulley or wheel 189 through a drive belt 186.

The independent direct drive mechanism illustrated in FIG. 1 avoids the use of the indirect drive and disengageable pin shown and described in detail in U.S. Pat. No. 5,435,238, which patent is hereby incorporated by reference as if set forth in full. That patent also describes the overall operation of the pear processing machine including the peeling mechanism and mechanism for positioning the pear on the coring tube, which is not repeated here in the interest of brevity. Although FIGS. 1 and 2 show a pear 7 being processed, the present invention may also be used with apples and melons and, perhaps, other fruit.

Figure 2:
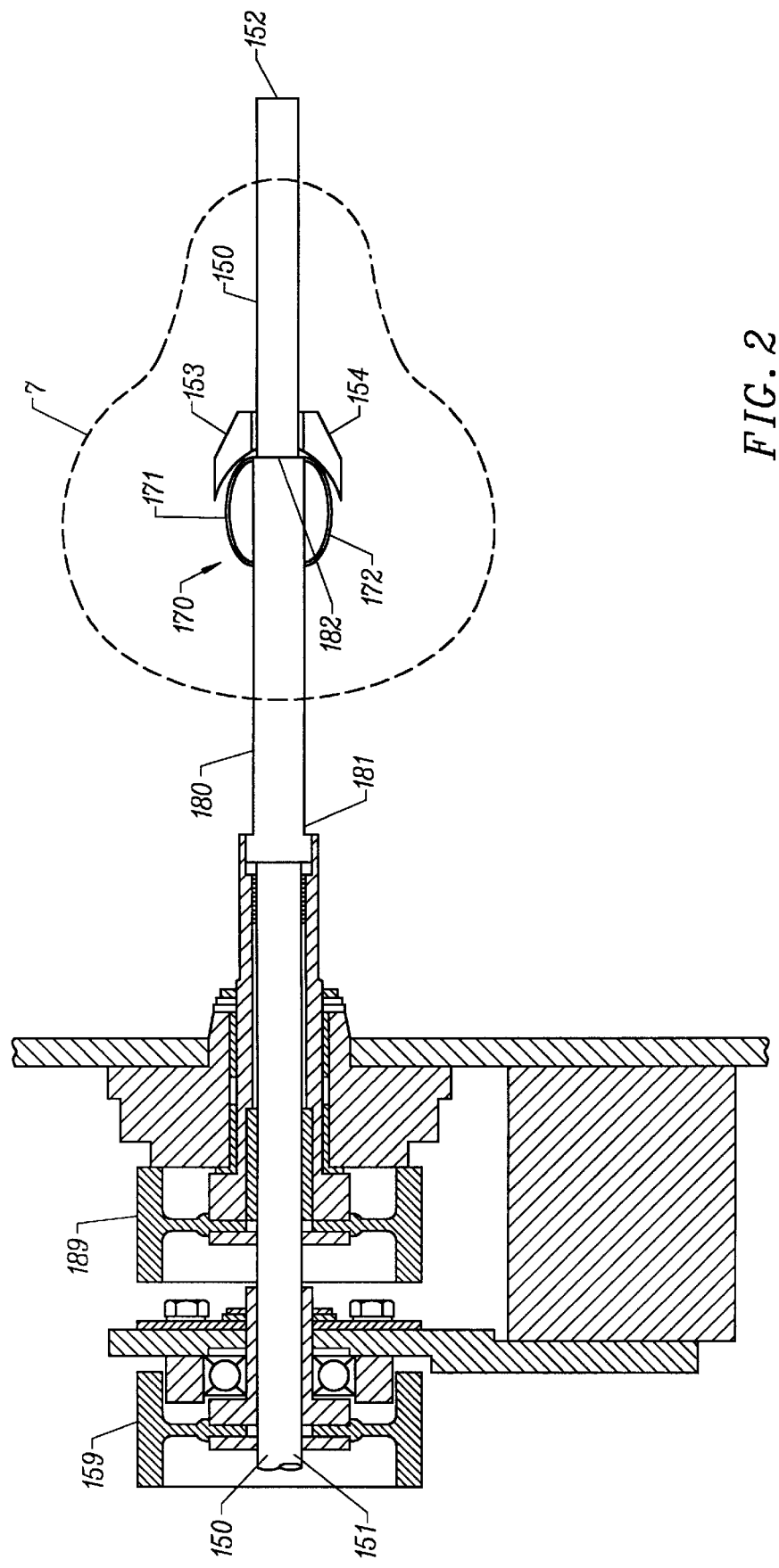
FIG. 2 is a schematic representation, partially in section, of a portion of the apparatus shown in FIG. 1.

FIG. 2 shows a sectional view of the drive pulleys 159 and 189 and how they are connected to the coring tube 150 and seed celling support tube 180. The seed celler support tube 180 is a cylindrical hollow tube having proximal and distal ends 181 and 182, respectively, and a seed celler knife means 170 is carried near the distal end 182 of seed celler support tube 180. Seed celler knife means preferably comprises two blades 171 and 172 mounted 180° apart on tube 180. A hollow cylindrical coring tube 150 is provided for holding and rotating the fruit. The coring tube has proximal and distal ends 151 and 152, respectively, and the coring tube 150 extends through the seed celler support tube 180. The distal end 152 of the coring tube extends beyond the distal end 182 of the seed celler support tube.

The preferred embodiment of the invention utilizes two turning fins 153 and 154 positioned at 180° from each other. The turning fins are carried by the distal end 152 of the coring tube. It is also within the scope of this invention to utilize only a single turning fin to cause rotation of the fruit during peeling and seed celling processes.

The first drive means of the present invention includes stepper motor 157, drive pulleys 158 and 159 and drive belt 156 connected to the coring tube 150 for rotating the coring tube through a predetermined first number of revolutions at a predetermined first rotational speed.

The second drive means includes stepper motor 187, drive pulley 188 and drive pulley 189 along with drive belt 186 for rotating the seed celler support tube 180 and the seed celler knife means 170. According to the present invention, the second stepper motor 187 is programmed to cause the seed celler knife means 170 to rotate at a second rotational speed different from the first rotational speed of the coring tube and thereby imparting relative rotational motion between the seed celler knife means 170 and the turning fins 153 and 154 carried by the coring tube, thereby severing the seed cell from the pear 7.

An important aspect of the present invention is that the seed celler knife means 170 may be either rotated at a faster speed than the turning fins or, alternately, may be rotated at a slower speed to cause the severing of the seed cell. Another significant aspect of the present invention is that the seed celler knife means 170 may be programmed to rotate relative to the turning fins to cause severing of the seed cell during a predetermined number of revolutions of the turning fin. For example, the differential rotational speeds between the seed celler knife means 170 and turning fin may be programmed so that the seed celler knife means 170 severs the seed cell during four complete revolutions of the turning fin.

Figure 3:
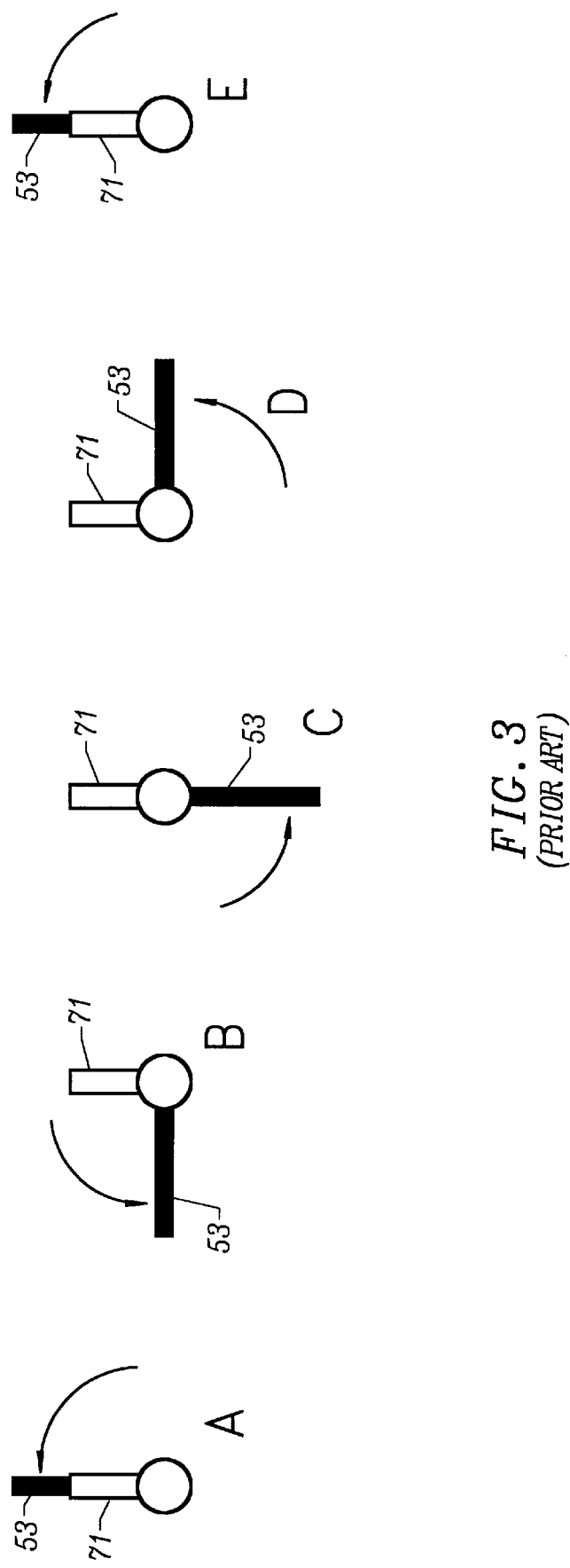
FIGS. 3(A–E) is a schematic representation of the operation of the seed cell mechanism of U.S. Pat. No. 5,435,238 showing the relative motion of one turning fin and one seed celler knife blade.
Figure 4:
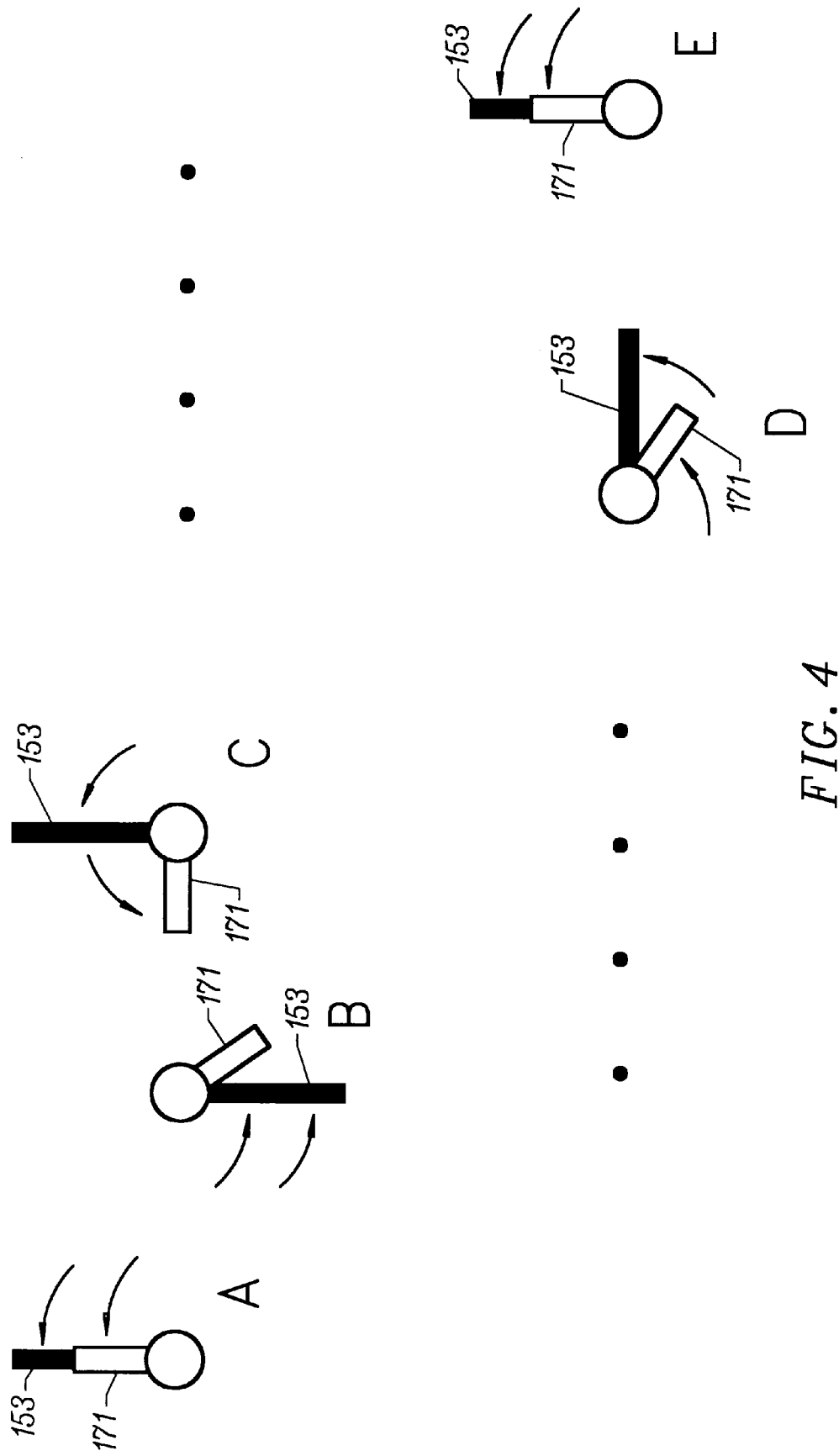
FIGS. 4(A–E) is a schematic representation of the operation of the present invention showing a single seed celler knife blade being driven at a faster rotational speed than a single turning fin.
Figure 5:
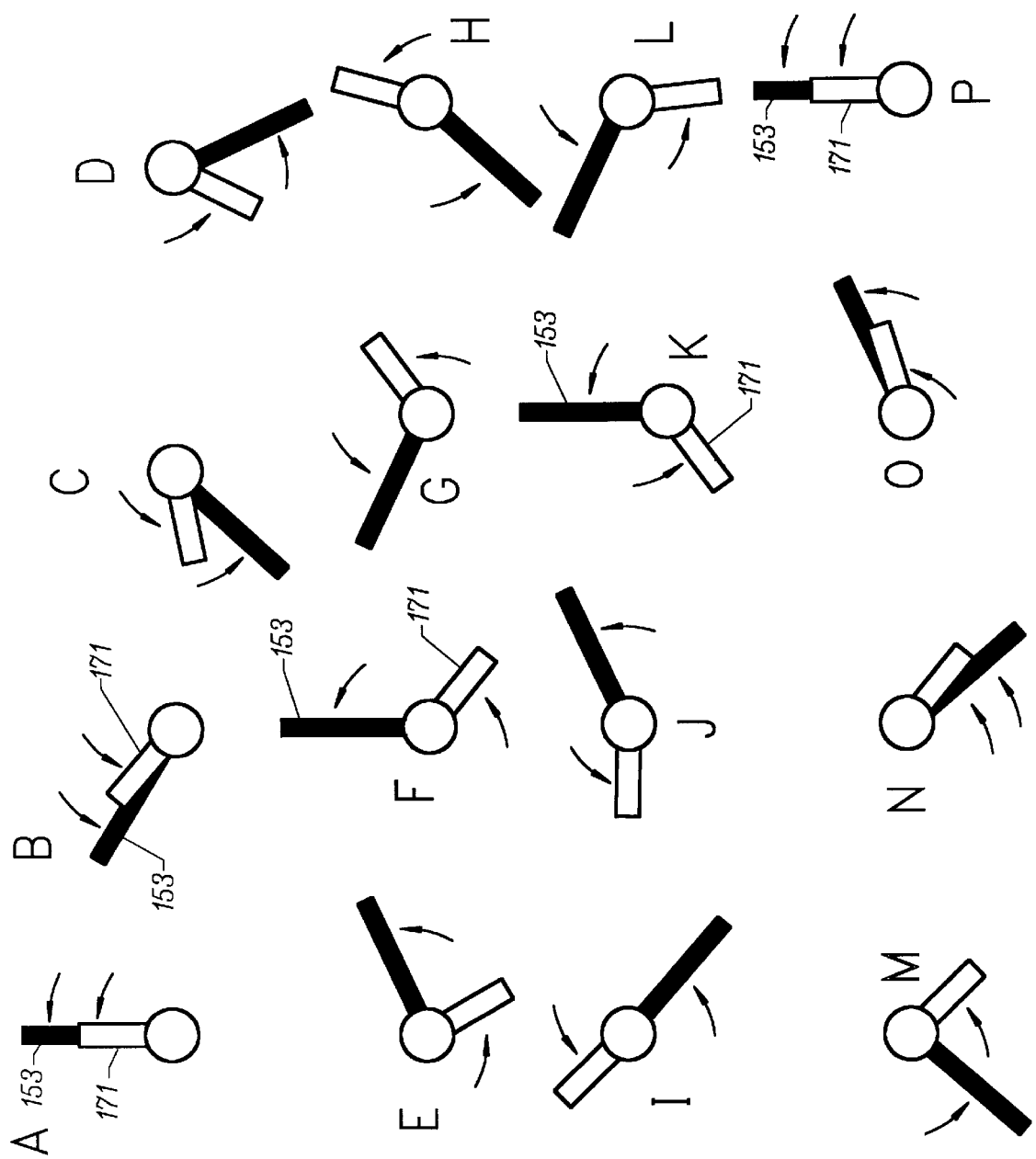
FIGS. 5(A–P) is a schematic representation of another embodiment of the present invention wherein a single seed celler knife blade is rotated at a slower speed than a single turning fin in order to sever the seed cell.

By way of contrast, the prior art U.S. Pat. No. 5,435,238 severed the seed cell within a single revolution of the turning fin, as shown schematically in FIG. 3. FIGS. 3, 4 and 5 are illustrations showing a single turning fin and a single seed celler knife blade to clarify the differences in operation between the present invention and the prior art. In actuality, the prior art and the present invention preferably use two turning fins and two seed celler knife blades, but illustrations including both fins and both blades are somewhat cluttered and differences in operation are not clearly presented. FIG. 3A shows the initiation of the seed celling sequence wherein the turning fin 53 continues to rotate and the seed cell knife blade 71 suddenly stops. The turning fin 53 is shown in FIGS. 3B, 3C and 3D as it rotates relative to the stationary seed celling blade 71 and FIG. 3E shows the completion of the seed cell severing process which has occurred during a single revolution of a single turning fin through 360°. When two seed celler blades are used, the seed cell is severed by the turning fin rotating through 180°.

The operation of the present invention is shown schematically in FIG. 4. FIG. 4A shows the initiation of the seed celling cycle. At this point in time, the single seed celling blade 171 begins to rotate at a somewhat higher speed than the single turning fin 153 as shown in FIGS. 4B and 4C. FIG. 4C illustrates the turning fin 153 has now rotated through a full 360° cycle but the seed celling blade 171 has only rotated relative to the turning fin through approximately one-fourth of a cycle. The relative rotation continues at these same speeds and the seed celling is completed as shown in FIG. 4E wherein the seed celling knife 171 has rotated a full 360° relative to the turning fin 153. FIG. 4 illustrates relative rotational speeds between the single seed celling knife 171 and the single turning fin 153 such that the seed celling knife severs the seed cell during the course of four full revolutions of the turning fin 153. If two seed celling knife blades are used, the seed cell would be severed in two full 360° revolutions of the turning fin. Therefore, in comparison to the operation of the prior art seed celler illustrated in FIG. 3, the present invention, as illustrated in FIG. 4, may be easily programmed to reduce the relative rotational speed of the seed celler knife compared to the turning fin to approximately one-fourth or less of the instantaneous relative rotational speeds of the prior art. This would impart a much lower instantaneous force to the seed cell and should appreciably reduce bursting of the pears as the seed cell is severed.

FIG. 5 illustrates another variation of the present invention wherein a single seed celler knife is rotated at a slower rotational speed than a single turning fin. FIG. 5A shows the initiation of the seed celling cycle wherein the seed celling knife 171 is programmed to start rotating at a slightly slower speed than the turning fin 153. The seed celling knife continues to rotate at a slower rate of speed than the turning fin 153. FIG. 5F shows the single seed celling knife having moved through an approximately 120° arc relative to the turning fin. FIG. 5K shows the seed celling knife 171 having rotated through a 240° arc relative to the turning fin 153 and FIG. 5P shows the seed celling knife having rotated a full 360° relative to the turning fin 153. The relative motion illustrated in FIG. 5 accomplishes the severing of the seed cell by a single knife during three revolutions of the turning fin 153.

FIGS. 4 and 5 are illustrations of particular rotational schemes between the seed celling knife and the turning fin. It is within the scope of the present invention to cause the severing of the seed cell during any predetermined number of revolutions of the turning fin and it is also within the scope of the invention to either rotate the seed celling knife at a higher rotational speed or at a lower rotational speed than the turning fin. It is also within the scope of the present invention to utilize different degrees of acceleration of the seed celling knife relative to the turning fin, although in the sequences illustrated in FIGS. 4 and 5, the seed celling knife is rotated at a constant rotational speed different from the constant rotational speed of the turning fin. It is also within the scope of the present invention to rotate the turning fin or fins at either higher or lower rpm's than the prior art '238 patent, although the preferred embodiment rotates the turning fin or fins at approximately the same rpm's. The invention may be used on pears, apples, honeydew melons, cantaloupe and other fruits.

What is claimed is:

1. In an apparatus for coring and seed celling fruit having a hollow, cylindrical seed celler support tube having proximal and distal ends, seed celler knife means carried near said distal end of said seed celler support tube, a hollow, cylindrical coring tube for holding and rotating said fruit having proximal and distal ends, said coring tube extending through said seed celler support tube, the distal end of said coring tube extending beyond the distal end of said seed celler support tube, at least one turning fin carried by the distal end of said coring tube, the improvement comprising:

first drive means connected to said coring tube for rotating said coring tube through a predetermined first number of revolutions at a predetermined first rotational speed, second drive means connected to said seed celler support tube for rotating said seed celler support tube and said seed celler knife means, and wherein said second drive means causes said seed celler support tube and said seed celler knife means to rotate at a second rotational speed different from said first rotational speed during a portion of said first number of revolutions, thereby imparting relative rotational motion between said seed celler knife means and said coring tube, thereby severing the seed cell from said fruit.

2. The apparatus of claim 1 wherein said first and second drive means comprise first and second stepper motors which directly drive said coring tube and said seed celler support tube, respectively.

3. The apparatus of claim 2 wherein said second stepper motor rotates at a higher rotational speed than said first stepper motor to cause said seed celler knife means to sever said seed cell.

4. The apparatus of claim 2 wherein said second stepper motor rotates at a lower rotational speed than said first stepper motor to cause said seed celler knife means to sever said seed cell.

5. The apparatus of claim 1 wherein said fruit is a pear and said seed celler knife means comprises a pair of blades and wherein said second drive means is rotated at a second rotational speed which severs said seed cell in two or more full revolutions of said turning fin, thereby reducing the instantaneous relative rotation between said seed cell knife blades and said seed cell to one-fourth or less of the instantaneous relative rotation caused by abruptly stopping the rotation of said seed celler knife as the pear is rotated by said turning fin.

\* \* \* \* \*